Nov. 22, 1960            F. E. SMITH            2,961,080

ORIENTING DEVICE FOR ARTICLES OF MANUFACTURE

Filed May 19, 1958

INVENTOR.
Floyd E. Smith
BY
ATTORNEY

United States Patent Office 2,961,080
Patented Nov. 22, 1960

2,961,080

ORIENTING DEVICE FOR ARTICLES OF MANUFACTURE

Floyd E. Smith, 3430 Glenside Ave., Erie, Pa.

Filed May 19, 1958, Ser. No. 736,222

9 Claims. (Cl. 193—43)

This invention relates to orienting devices and, more particularly, to machines and mechanisms for feeding articles of manufacture having dissimilar ends in such manner that the corresponding end of each article is always in the same direction.

Various machines and mechanisms have been provided for orienting and sorting articles of manufacture. These machines have sometimes taken the form of feeders wherein the articles are deposited in a hopper and then moved along a path having baffles positioned so that articles which are improperly oriented are dropped off of the track. This type of sorting mechanism works very well where the outside surface of the article has a shape such that the orientation of the article can be detected by the baffling on the tracks and, therefore, the undesired parts can be rejected. If the parts are symmetrical on the outside with no part thereon which can be used for reference surface but with an inner characteristic shape which distinguishes one end from the other, there is no practical feeder now in use for detecting which end of the article is foremost.

The present invention provides a machine and mechanism for feeding articles of manufacture in a continuous path and in detecting and orienting the improperly oriented articles. The machine automatically reverses these articles so that the articles are oriented properly and does so with a simple and inexpensive mechanism.

It is, accordingly, an object of this invention to overcome the disadvantages of prior machines and mechanisms and, more particularly, it is an object of the invention to provide a machine for orienting articles of manufacture having symmetrical outer surfaces wherein the machine is simple in construction, economical to manufacture, and simple and efficient in operation.

Another object of the invention is to provide a detecting device in combination with a machine for orienting articles of manufacture having symmetrical outer surfaces and non-symmetrical inner surfaces wherein the machine will insure that the corresponding end of each article fed is fed in a given direction.

A further object of the invention is to provide an improved orienting and feeding machine.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 2:
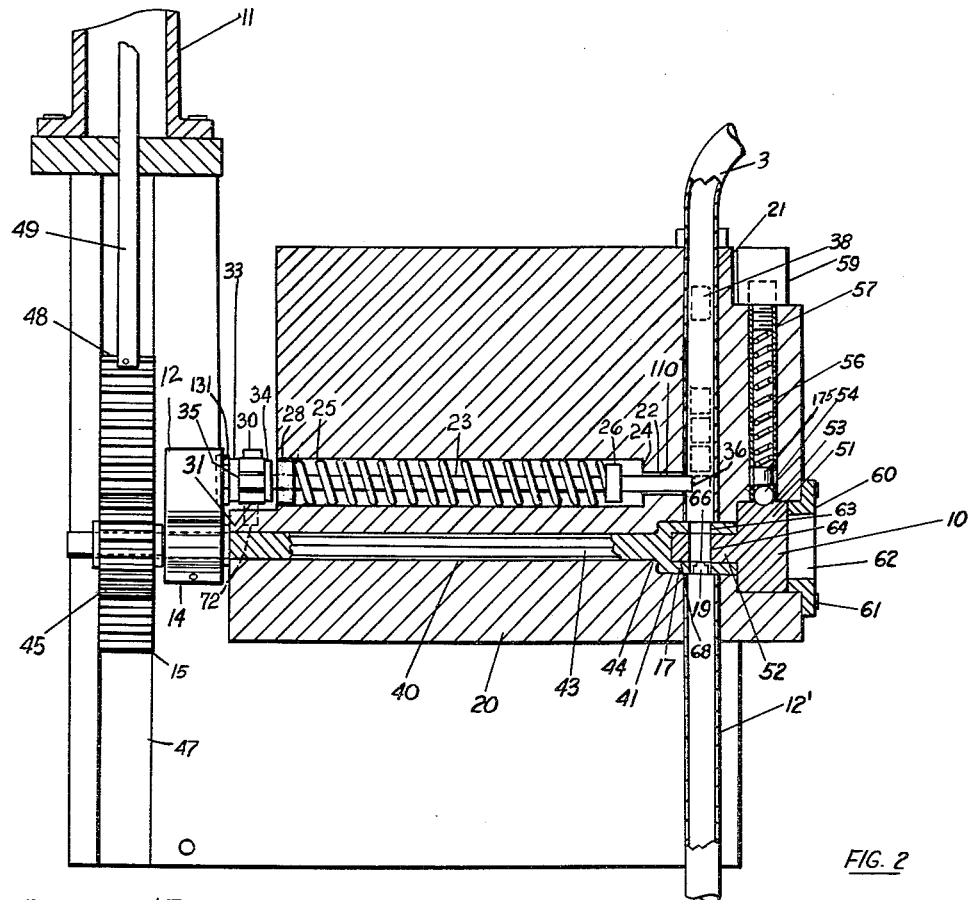
Fig. 2 is a central transverse cross sectional view of the machine.

Now with more specific reference to the drawing, the machine is shown in its preferred embodiment; however, it is understood that it may take other forms wherein the structure recited in the claims is utilized. While an air cylinder is shown which finally delivers to a shaft a rotation of one hundred eighty degrees first in one direction and then in the other direction, it is clear that a motor having a suitable rotation and cam mechanism could be substituted for this air cylinder or any other suitable motor arrangement could be utilized. The articles for which this machine is especially useful are articles which have a symmetrical external configuration having no reference point or reference area which can be utilized to detect which end of the article is headed in a forward direction but which must be oriented in a particular manner.

The machine disclosed herein has a body or base casing 20 which has a vertical bore 21 therethrough. The bore 21 receives a feed tube 3. The feed tube 3 has a discharge end wherein parts may be fed from a suitable supply source through the feed tube 3 and discharged through the orienting device through a tube 12' to a suitable repository or to a machine whereon the articles are to be utilized.

The body 20 has an upper lateral bore 22 counterbored at 23, leaving a shoulder 24 therein. The counterbore 23 and bore 22 receive a stop pin 110. A helical compression spring 25 is disposed in the counterbore 23 and concentrically disposed on the stop pin 110. The stop pin 110 has a collar 26 fixedly attached thereto which forms engaging support with the end of the spring 25. The outer end of the spring 25 engages a plug 28 which is threadably supported in the end of the counterbore 23 or which may be fixed thereto in any suitable manner.

A bell crank 35 has a first leg 31, a second leg 131, and a bore in the bell crank 35. The bore receives a stud 30 which is threadably attached to the body 20 and the bell crank 35 freely rotates on the stud 30.

The first leg 31 has a kerf 170 in its end and the kerf 170 receives the part of the stop pin 110 between spaced washers 33 and 34. The washers 33 and 34 are fixed to the outer end of the stop pin 110. The ends of the leg 31 which define the kerf 170 are received between the washers 33 and 34.

The other leg 131 of the bell crank 35 is engaged by an arm 12. The arms 12 and 14 are integral with each other and a shaft 43 is fixed to the arms 12 and 14 and they extend therefrom.

When the stop pin 110 is in the position shown, its inner end 36 will prevent articles 38 from sliding down the tube 3.

When the arm 12 engages the leg 31 of the bell crank 35, it will rotate the bell crank 35 about the stud 30. This will draw the stop pin 110 outward from under the articles 38 in the tube 3 and another article may move downward. Thus, upon each downward stroke of a piston rod 49, rack 15 will rotate the spur gear 45, shaft 43, and the arms 12 and 14. The arm 12 will engage the leg 131 which will rotate the bell crank 35 and withdraw the pin 110 to allow another article to descend. The upward stroke of the piston rod 49 will allow the spring 25 to move the pin 110 to return to the position shown. The distance from the top of the inner spool to the bottom of the stop pin 110 should be approximately one and one-half times the length of one of the articles 38.

A lower bore 40 is counterbored at 41 to receive an inner spool 17 which is integrally attached to the shaft 43 at 44. The shaft 43 extends through the lower bore 40 out to the opposite end of the body 20 and has the arm 14 rigidly attached thereto. A spur gear 45 is also rigidly attached to the shaft 43. The spur gear 45 has external teeth which are engaged by the teeth on a rack 15. The rack 15 slides in ways 47 and an upper end 48 of the rack 15 is attached to a piston rod 49 which is in turn attached to a piston in a cylinder 11. The piston in the cylinder 11 may be actuated by air and the cylinder 11 is a conventional type having proper valves thereon to cause its piston attached to the piston rod 49 to move upwardly and downwardly intermittently. The piston in the cylinder 11 may be actuated by a circuit such as shown in Fig. 6 of Patent No. 2,728,322.

An outer spool 10 has an enlarged cylindrical portion 51 and a central shaft portion 52 integrally attached thereto. A detent opening 53 in the periphery of the portion 51 engages a pawl in the form of a spherical ball indicated at 54 which is freely disposed in a bore 56 and urged downwardly therein by means of a compression spring 57. The spring 57 engages a cylindrical slug 175 which engages the ball 54 at the lower end thereof and is held in place by means of a headed stud 59 which threadably engages the bore 56.

The outer spool 10 is held in its counterbored opening 53 by means of a plate 60 which is attached at the end of the body 29 by means of screws 61 and an inner portion overlies the outer portion of the outer spool 10. A central opening 62 in the plate 60 allows the operator to observe the end of the outer spool 10 and, by a suitable index mark on the end of the spool 10, the relative position thereof can be determined.

The inner spool 17 has a diametrically disposed bore 63 therein which extends therethrough. A corresponding bore 64 in the outer spool 10 is disposed in alignment with the bore 63 when the arm 12 is in the position shown and the ball 54 engages the detent opening 53.

Figure 4:
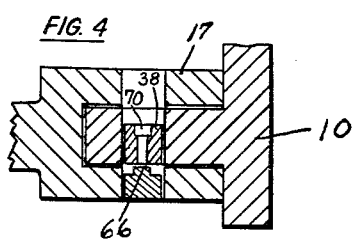
Fig. 4 is a view similar to Fig. 3 showing a properly oriented article therein.

A receiving pin 19 is fixed in the lower side of the bore 63 and it will have a pintle 66 on one end thereof which will be suitably shaped to enter one end of the article 38 but will not enter the other end; that is, the inner end of the pintle 66 will be flush with the inner portion on a bore 68 in the inner spool 17 which receives the shaft portion 52. Therefore, when one of the articles 38 is turned in one direction so that the reduced size end thereof is disposed as in Fig. 4, it will rest on top of the end of the pintle 66 and, therefore, the shaft 43 and the inner spool 17 can rotate freely around the outer spool 10 and the article 38 when the upper part of the bore 63 rotates to the lower part of its travel and is aligned with the bottom end of the bore 64 and will fall freely to the spool 10.

Figure 3:
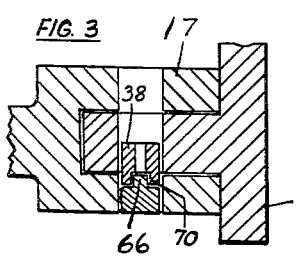
Fig. 3 is an enlarged partial cross sectional view of the mechanism showing an improperly oriented article therein.
Figure 1:
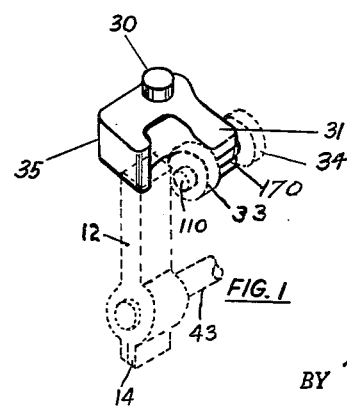
Fig. 1 is an isometric view of a part of an orienting machine according to the invention.

On the other hand, if the article 38 is reversed and a counterbore 70 thereof receives the pintle 66 as in Fig. 3, the outer spool 10 will be keyed to the inner spool 17 and will rotate along with the shaft 43 and the article 38 will be reversed and will fall through the tube 12' with its counterbored end ahead as in the case of the article first described.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. An orienting device comprising a body member, an upper and a lower bore in said body member, said upper and said lower bores in said body member being counterbored from opposite ends and disposed parallel to each other, a vertical bore in said body member intersecting said upper and said lower bores, a stop pin in said upper bore extending through the counterbore thereof and projecting out of one end thereof, one end of said stop pin extending into said vertical bore, a limit means on said stop pin, a helical compression spring in said upper bore counterbore, one end of said spring engaging said limit means and the other end of said spring engaging plug means disposed on said body member, said spring urging said stop pin toward said vertical bore, a bellcrank swingably attached to said body member and having two legs, one leg of said bellcrank engaging means on said stop pin, a rod rotatably supported in said lower bore, a cylindrical shape inner spool attached to one end of said rod, said inner spool being disposed in said lower bore counterbore, an outer spool, an axially disposed cylindrical bore in said inner spool, said outer spool having a cylindrical portion disposed in said bore in said inner spool, a radially disposed bore in said inner spool and a radial bore in said outer spool registering with said bore in said inner spool, said bores in said outer spool and in said inner spool being aligned with said vertical bore, means on said radially disposed bore in said inner spool having a portion thereof adjacent the outer edge of said cylindrical portion of said outer spool for holding properly aligned articles adapted to be fed through said vertical bore from having a part thereof extending into said radial bore in said inner spool while a part thereof is in said bore in said outer spool to prevent said articles from rotatably connecting said inner spool and said outer spool together when said articles are deposited in said upper bore whereby said articles are completely contained in said bore in said outer spool, said spools being attached to a shaft, means to rotate said shaft to rotate said inner spool around said outer spool to allow said articles to fall freely from said bore in said outer spool through said radial bore in said inner spool when said inner spool has been rotated to bring said radial bore therein into alignment with the opposite side of said outer spool bore, said means in said bore in said inner spool allowing said articles when misaligned to interlock said inner spool and said outer spool together whereby said inner spool and said outer spool rotate together with said misaligned articles therein whereby when said radial bore in said inner spool reaches the lower part of its rotational path, said articles in said outer spool are allowed to fall from said bore in said outer spool into the lower part of said vertical bore, means to rotate said rod, and means to engage said bellcrank to move said stop pin out of said vertical bore intermittently.

2. The orienting device recited in claim 1 wherein said means to rotate said shaft comprises a spur gear on said shaft, a motor, a rack engaging said gear, and means on said motor to move said rack in a first direction to rotate said shaft to bring said bore in said inner spool into alignment with the upper part of said vertical bore, said motor moving said rack to rotate said inner spool one hundred eighty degrees to bring said bore in said inner spool into alignment with the lower part of said vertical bore.

3. The orienting device recited in claim 2 wherein said rod has an arm attached thereto, said arm comprising said means to engage said bellcrank to move said stop pin out of said vertical bore when said shaft has been rotated to a first position whereby additional said articles move down said vertical bore and to said spools.

4. The orienting device recited in claim 3 wherein said means in said radial bore in said inner spool comprises a member having a pintle disposed in the center thereof, said pintle terminating adjacent the outer periphery of said outer spool, said pintle being adapted to be received in a first end of said misaligned articles whereby a part of said articles lock said outer and inner spools together, said pintle engaging the second ends of said articles when said articles are properly oriented whereby said inner spool may rotate around said outer spool and said articles may fall through said vertical bore without being reversed.

5. The orienting device recited in claim 4 wherein a detent opening is formed on the outer periphery of said outer spool, and a spring pressed detent is disposed in said counterbore in said lower bore of said body member, said detent engaging said opening to urge said inner spool to remain with its bore disposed in alignment with said vertical bore.

6. An orienting device comprising a body, a lower bore and a vertical bore in said body, said vertical bore intersecting said lower bore, an inner spool having an axial bore, an outer spool having a cylindrical portion disposed in said axial bore, a radial bore in said inner spool aligned with a radial bore in said outer spool, means on said inner spool to allow properly aligned articles adapted to be fed by said orienting device to move through said bore in said outer spool into said bore in said inner spool, and means to rotate said outer spool around said inner spool to a discharge position to allow said articles to fall from said inner spool and said outer spool without being reoriented or rotated, said means on said inner spool engaging said articles when misaligned whereby said articles lock said inner and outer spools together for rotation whereby said inner spool is rotated with said articles therein and said misaligned articles are oriented.

7. The orienting device recited in claim 6 wherein means is provided to limit the number of articles which move through said vertical bore when said inner spool is rotated.

8. The orienting device recited in claim 7 wherein said means for limiting the number of said articles comprises a stop rod, an arm attached to said inner spool, and stop means moved into said vertical bore when said inner spool is in a first position, said stop means being moved out of said vertical bore when said outer spool is moved to a second position.

9. An orienting device comprising a body, a lower bore and a vertical bore in said body, said vertical bore intersecting said lower bore, an inner spool having an axial bore, an outer spool having a cylindrical portion disposed in said axial bore, a radial bore in said inner spool aligned with a radial bore in said outer spool, means on said inner spool to allow properly aligned articles adapted to be fed by said orienting device to move through said bore in said outer spool into said bore in said inner spool, means to rotate said outer spool around said inner spool to allow said articles to fall from said inner spool and said outer spool without reorienting or rotating, detent means to hold said outer spool against rotation when said articles are properly oriented, and means on said inner spool engaging said articles when misaligned whereby said articles lock said inner and said outer spools together to rotate said inner spool with said outer spool against the force of said detent means whereby said inner spool is rotated with said articles therein and said misaligned articles are rotated therewith and thereby oriented.

References Cited in the file of this patent

UNITED STATES PATENTS

| | | |
|---|---|---|
| 1,347,851 | Haefele | July 27, 1920 |
| 2,264,105 | White | Nov. 25, 1941 |
| 2,759,631 | Ervine | Aug. 21, 1956 |